US012381054B2

(12) United States Patent
Jonsson Seither et al.

(10) Patent No.: US 12,381,054 B2
(45) Date of Patent: Aug. 5, 2025

(54) ELECTRIC CURRENT KNIFE SWITCH

(71) Applicant: ABB Schweiz AG, Baden (CH)

(72) Inventors: Erik Jonsson Seither, Ranheim (NO); Nina Sasaki Støa-Aanensen, Trondheim (NO)

(73) Assignee: ABB Schweiz AG, Baden (CH)

(*) Notice: Subject to any disclaimer, the term of this patent is extended or adjusted under 35 U.S.C. 154(b) by 113 days.

(21) Appl. No.: 18/180,982

(22) Filed: Mar. 9, 2023

(65) Prior Publication Data

US 2023/0290593 A1 Sep. 14, 2023

(30) Foreign Application Priority Data

Mar. 10, 2022 (EM) ................................ 22161353.2

(51) Int. Cl.
*H01H 33/53* (2006.01)
*H01H 33/70* (2006.01)

(52) U.S. Cl.
CPC ........ *H01H 33/7023* (2013.01); *H01H 33/53* (2013.01)

(58) Field of Classification Search
CPC ............... H01H 33/7023; H01H 33/53; H01H 33/7015; H01H 33/12; H01H 33/22; H01H 33/91; H01H 31/28; H01H 31/003; H01H 1/42; H01H 23/02; H01H 23/12; H01H 9/30

(Continued)

(56) References Cited

U.S. PATENT DOCUMENTS 2,979,590 A 4/1961 Sandin
4,046,979 A * 9/1977 Hertz .................. H01H 33/901 218/66

(Continued)

FOREIGN PATENT DOCUMENTS

CN 203631412 U 6/2014
EP 2312603 A1 4/2011

(Continued)

OTHER PUBLICATIONS

Extended European Search Report; Application No. EP22161353; Completed: Aug. 15, 2022; Mailed: Aug. 24, 2022; 10 Pages.

*Primary Examiner* — William A Bolton
(74) *Attorney, Agent, or Firm* — Whitmyer IP Group LLC

(57) ABSTRACT

An electric current switch comprising: a housing; a contact lever including a proximal end and a distal end and is rotatable at a pivot point at the distal end, the contact lever including a lever arcing contact area and a lever arcing contact at the proximal end; a fixed contact assembly configured to receive the contact lever in a closed position of the contact lever, the fixed contact assembly including fixed main contacts and a fixed arcing contact, the fixed contact assembly being fixed relative the housing accommodating the fixed contact; the contact lever is configured to rotate about the pivot point between the closed position and an open position, the electric current switch further including a nozzle fixedly arranged to surround the position of the fixed arcing contact, the nozzle including at least one outlet to provide a flow of cooling gas towards the fixed arcing contact, the flow of cooling gas being in the proximal direction of the contact lever as when the contact lever in the closed position.

20 Claims, 6 Drawing Sheets

(58) Field of Classification Search
USPC ........ 218/49, 12, 13, 15, 18, 20, 21, 32, 45, 218/55, 67, 79, 80; 200/48 KB, 50.38, 200/50.39, 461, 554
See application file for complete search history.

(56) References Cited

U.S. PATENT DOCUMENTS

| | | | | |
|---|---|---|---|---|
| 5,013,876 | A * | 5/1991 | Chabala | H01H 1/42 200/254 |
| 8,263,890 | B2 * | 9/2012 | Fujita | H01H 31/003 200/554 |
| 8,570,121 | B2 * | 10/2013 | Sawada | H01H 3/46 335/220 |
| 8,969,748 | B2 * | 3/2015 | Endre | H01H 1/42 200/254 |
| 9,177,739 | B2 * | 11/2015 | Miller | H01H 31/003 |
| 9,466,955 | B2 * | 10/2016 | Saxegaard | H02B 13/0352 |
| 10,693,284 | B2 * | 6/2020 | Benson | H02B 11/24 |
| 2012/0300358 | A1 * | 11/2012 | Johnson | H01H 3/40 29/606 |
| 2017/0110273 | A1 * | 4/2017 | Rhein | H01H 31/28 |

FOREIGN PATENT DOCUMENTS

| | | | |
|---|---|---|---|
| EP | 2830077 | A1 | 1/2015 |
| FR | 1106111 | A | 12/1955 |
| JP | 2010067446 | A | 3/2010 |

* cited by examiner

ELECTRIC CURRENT KNIFE SWITCH

TECHNICAL FIELD

The present invention relates to an electric current switch.

BACKGROUND

Electric switches for medium- and high voltage switchgear are subject to electric arcing during current interruption and contact making events. Suppressing the arcs is important to protect the electric switch itself and electric devices connected to the electric switch.

Effects of arcs may be suppressed by appropriate material selection of arcing contact areas of the connecting parts of the electric switch that can withstand and reduce the arcing. Further, arc-extinction can be provided by application of an appropriate gas onto the arc, such as the often-used gas $SF_6$.

However, there is still room for improvements with regards to arc-extinction as is set out in more detail below.

SUMMARY

In view of the above-mentioned and other drawbacks of the prior art, it is an object of the present invention to provide an electric current switch that at least partly alleviates the deficiencies with prior art.

According to a first aspect of the invention, there is provided an electric current switch comprising: a housing; a contact lever comprising a proximal end and a distal end, the contact lever being rotatable at a pivot point at the distal end, the contact lever comprising a lever main contact area and a lever arcing contact at the proximal end; a fixed contact assembly configured to receive the contact lever in a closed position of the contact lever, the fixed contact assembly comprising a fixed main contact and a fixed arcing contact, the fixed contact assembly being fixed relative the housing accommodating the fixed contact; the contact lever is configured to rotate about the pivot point between the closed position and an open position, the electric current switch further comprising a nozzle fixedly arranged to surround the position of the fixed arcing contact, the nozzle comprising at least one outlet to provide a flow of cooling gas towards the fixed arcing contact, the flow of cooling gas being in the proximal direction of the contact lever as when the contact lever in the closed position.

The present invention is at least partly based on the realization that a less complex electric current switch with improved cooling of the arcing contacts and the regions in their vicinity can be provided by fixing the nozzle at the fixed contact assembly. Thus, with the proposed electric switch, the contact lever moves for switching between the closed and the open positions, whereas the nozzle and the fixed contact assembly are static with respect to the housing, thereby requiring only a small number of moving parts. Further, the invention is also based on the realization to provide the cooling gas in a proximal direction of the contact lever, towards an arc root, which advantageously provides for reduced amounts of hot gas flowing towards the fixed main contacts. Instead, the hot gas flows proximally, preferably away from the fixed main contacts.

The housing provides an assembly base for the electric switch. The pivot point is preferably fixed in relation to the housing.

In the closed position of the contact lever, an electric current may pass between the lever main contact area and the fixed main contact. In the open position, the contact lever and the fixed contact are not in contact whereby an electric current may not pass between them.

In the closed position, the lever main contact area mate with the fixed main contact.

In embodiments, the nozzle may comprise at least one inlet for compressed gas, the electric current switch comprising a puffer connected via hoses or pipes to the inlets, the puffer is configured to provide the compressed cooling gas to the nozzle. Puffers are known per se and here provides an advantageous way to timely provide cooling gas to the nozzle via the hoses or pipes. Further, the puffer advantageously provides the possibility to use various cooling gases such as air or other gas mixtures.

The cooling gas may for example comprise at least one background gas component selected from the group consisting of $CO_2$, $O_2$, $N_2$, $H_2$, air, $N_2O$, in a mixture with a hydrocarbon or an organo fluorine compound. For example, the cooling gas may comprise dry air or technical air. The cooling gas may in particular comprise an organofluorine compound selected from the group comprising of: a fluoroether, an oxirane, a fluoramine, a fluoroketone, a fluoroolefin, a fluoronitrile, and mixtures and/or decomposition products thereof. In particular, the cooling gas may comprise as a hydrocarbon at least $CH_4$, a perfluorinated and/or partially hydrogenated organofluorine compound, and mixtures thereof. The organofluorine compound is preferably selected from the group comprising of: a fluorocarbon, a fluoroether, a fluoroamine, a fluoronitrile, and a fluoroketone; and preferably is a fluoroketone and/or a fluoroether, more preferably a perfluoroketone and/or a hydro fluoroether, more preferably a perfluoroketone having from 4 to 12 carbon atoms and even more preferably a perfluoroketone having 4, 5 or 6 carbon atoms. In particular, the perfluoroketone is or comprises at least one of: $C_2F_5C(O)CF(CF_3)_2$ or dodecafiuoro-2-methylpentan-3-one, and $CF_3C(O)CF(CF_3)_2$ or decafluoro-3-methylbutan-2-one. The cooling gas preferably comprises the fluoroketone mixed with air or an air component such as $N_2$, $O_2$, and/or $CO_2$. Another possible cooling gas is $SF_6$.

In embodiments, a drive mechanism of the puffer is configured to push on the contact lever when it moves from the closed position towards the open position, and while pushing on the contact lever it causes a flow of the compressed gas through the hoses or pipes to the nozzle. Advantageously, the drive mechanism ensures that the cooling gas is timely ejected to suppress the arc.

In embodiments, the nozzle may be fixedly attached to the fixed contact assembly to ensure that the cooling gas is provided towards an arc root. Further, with the nozzle attached to the fixed contact assembly, a more compact electric switch is provided compared to having the nozzle be arranged separately from the fixed contact assembly.

In embodiments, the nozzle may comprise an inclined surface angled with respect to an axis along which the contact lever is configured to move in the nozzle, the inclined surface reaches away from the fixed main contact so that at least a portion of the outlet gas is directed away from the lever arcing contact and the fixed arcing contact. Advantageously, the inclined surface provides for improved guiding of hot cooling gas away from the fixed contact.

In embodiments, the fixed arcing contact of the fixed contact assembly may comprise an inclined portion angled with respect to a contact section configured to make contact with the lever arcing contact of the contact lever, the inclined portion being adapted for guiding cooling gas in the proximal direction. Advantageously, the inclined surface provides for improved guiding of hot cooling gas away from the fixed main contact where the contact lever main contact area makes contact with the fixed contact.

In embodiments, the electric current switch may further comprise an earth contact configured to receive the contact lever in an earthed position of the contact lever, the contact lever is configured to rotate about the pivot point between the earthed position, the closed position, and the open position. The earth contact may be fixed in relation to the housing. Thus, the contact lever may be moved to three positions, while the earth contact, the fixed contact, and the nozzle are fixed in relation to the housing.

In embodiments, the fixed contact and the earth contact may be stationary with respect to the pivot point when the contact lever moves between the earthed position, the closed position, and the open position.

In embodiments, the nozzle may comprise a receiving portion for the contact lever, the receiving portion is adjacent to the fixed arcing contact of the fixed contact and is offset in the proximal direction of the contact lever as defined when the contact lever in the closed position, so that the receiving portion is spaced apart from the contact lever in the proximal direction. This provides for further improved guiding of the hot cooling gas away from the fixed main contact.

In embodiments, the nozzle may comprise a through-hole in the proximal direction for guiding cooling gas away from the fixed arcing contact.

In embodiments, the lever contact may comprise a cut-out adjacent to the lever arcing contact of the contact lever. The cut-out advantageously reduces the amount of hot cooling gas that reaches in the distal direction of the contact lever. The cut-out is distally located in relation to the lever arcing contact.

In embodiments, the nozzle may comprise two outlets arranged on opposite sides of an opening of the nozzle adapted to receive the contact lever so that the outlets are arranged on opposite sides of the contact lever in the closed position, the outlets are configured to cooperatively create a flow of cooling gas in the proximal direction towards the fixed arcing contact. The combination of the two outlets creates an improved proximal-directed flow towards the arc root. The proximal directed flow may be split in two directions: along the arc towards the contact lever, and along the fixed arcing contact of the fixed contact assembly.

In embodiments, the nozzle may comprise an outlet arrangement adapted so that the outlet is located in the cut-out when the contact lever is in the closed position.

In embodiments, the outlets may be configured to direct the compressed gas at an angle in the range of 0-90 degrees with respect to the contact lever when it is in the closed position. In possible implementations, the angle is in the range of 10-75 degrees, or preferably in the range of 15-60 degrees with respect to the contact lever when it is in the closed position.

In embodiments, the contact lever may be a knife contact, and the electric current switch may be a knife switch.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION

In the present detailed description, various embodiments of the present invention are herein described with reference to specific implementations. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the scope of the invention.

Figure 1:
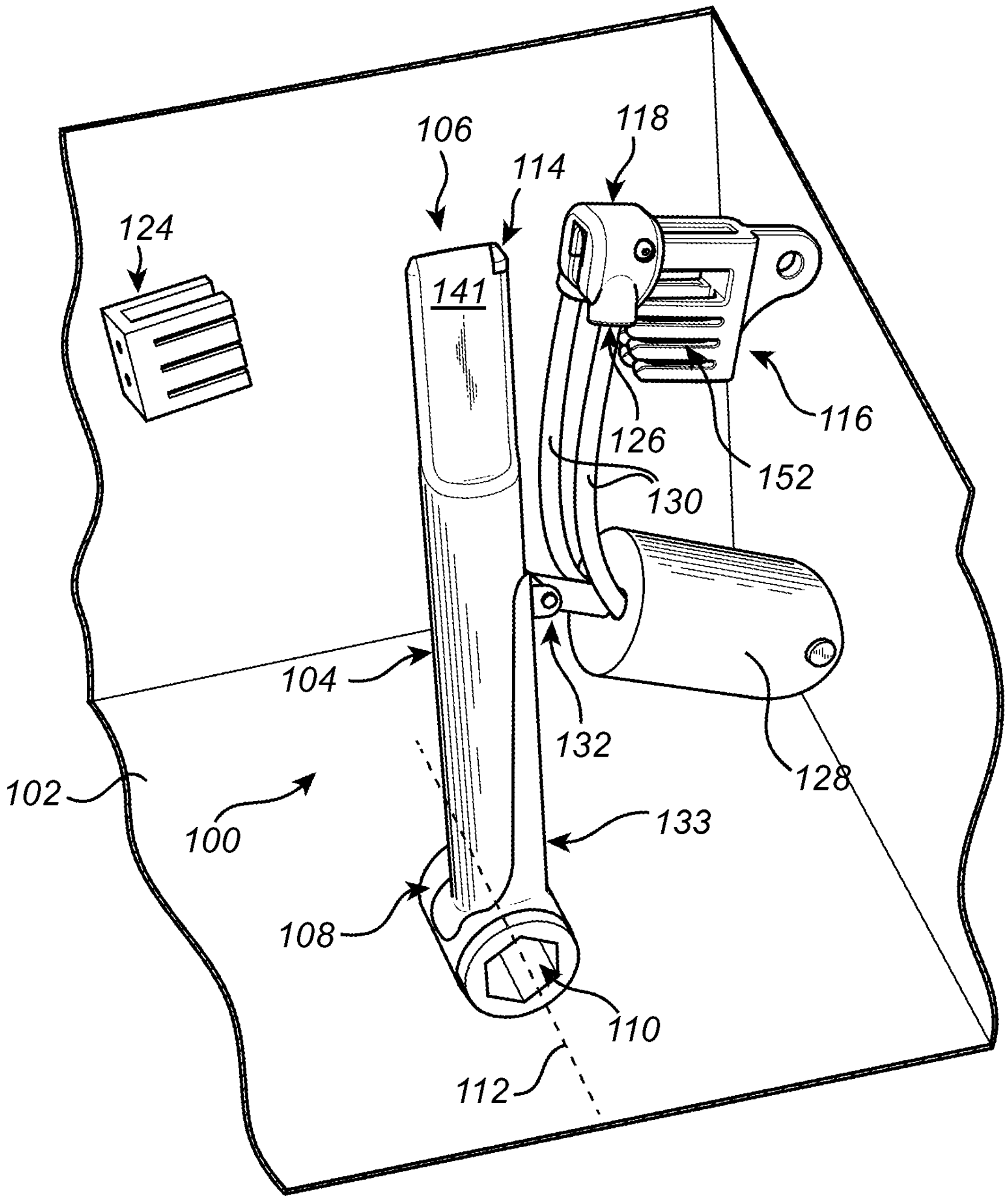
FIG. 1 conceptually illustrates an example electric current switch according to embodiments of the invention.

FIG. 1 conceptually illustrates an electric current switch 100 according to embodiments of the present invention. The electric current switch 100 comprises a conceptually illustrated housing 102 for providing an assembly structure for the components of the electric current switch 100.

The electric current switch 100 comprises a contact lever 104 comprising a proximal end 106 and a distal end 108. The contact lever 104 is rotatable at a pivot point 110 at the distal end 108. The pivot point 110 provides for the contact lever 104 to be rotatable about a rotation axis 112. The contact lever 104 comprising a lever arcing contact 114 at the proximal end 106 and a lever main contact area 141 adapted to make contact with a fixed main contact 152 of a fixed contact assembly 116.

The electric current switch 100 further comprises the fixed contact assembly 116 configured to receive the contact lever 114 in a closed position. The fixed contact comprising a fixed arcing contact 115, better seen in FIG. 2. Further, the fixed contact assembly 116 is spatially fixed relative the housing 102 that accommodates the fixed contact assembly. For example, the fixed contact assembly 116 may be bolted or screwed to a fixing point of the housing 102.

The contact lever 104 is configured to rotate about the pivot point 110 between the closed position and an open position. In other words, the contact lever can rotate about the axis 112 so that the proximal end 106 is received in the fixed contact assembly 116 so that an electric current may flow between the lever main contact area (141) of the contact lever 104 and the fixed main contact 152 of the fixed contact assembly 116. In the perspective of FIG. 1, the contact lever 104 is rotated clockwise to reach the closed position. If the contact lever is rotated counterclockwise from the closed position, the proximal end 106 is spatially separated from the fixed contact assembly 116, leaving the contact lever 104 in the open position where electric current may not flow between the contact lever 104 and the fixed contact assembly 116.

During a current interruption, when the contact lever 104 moves from the closed position to the open position, or during a current making event when the contact lever 104 moves from the open position to the closed position, an arc may be produced between the contact lever 104 and the fixed contact assembly 116. The arcs are produced at the lever arcing contact 114 of the contact lever 104 and the fixed arcing contact 115 of the fixed contact assembly 116. The arcing contacts are adapted to be durable and able to withstand the arc by appropriate material selection. Arcing contact materials may be various electrical conducting and heat resistant alloys, typical containing Tungsten.

Figure 2:
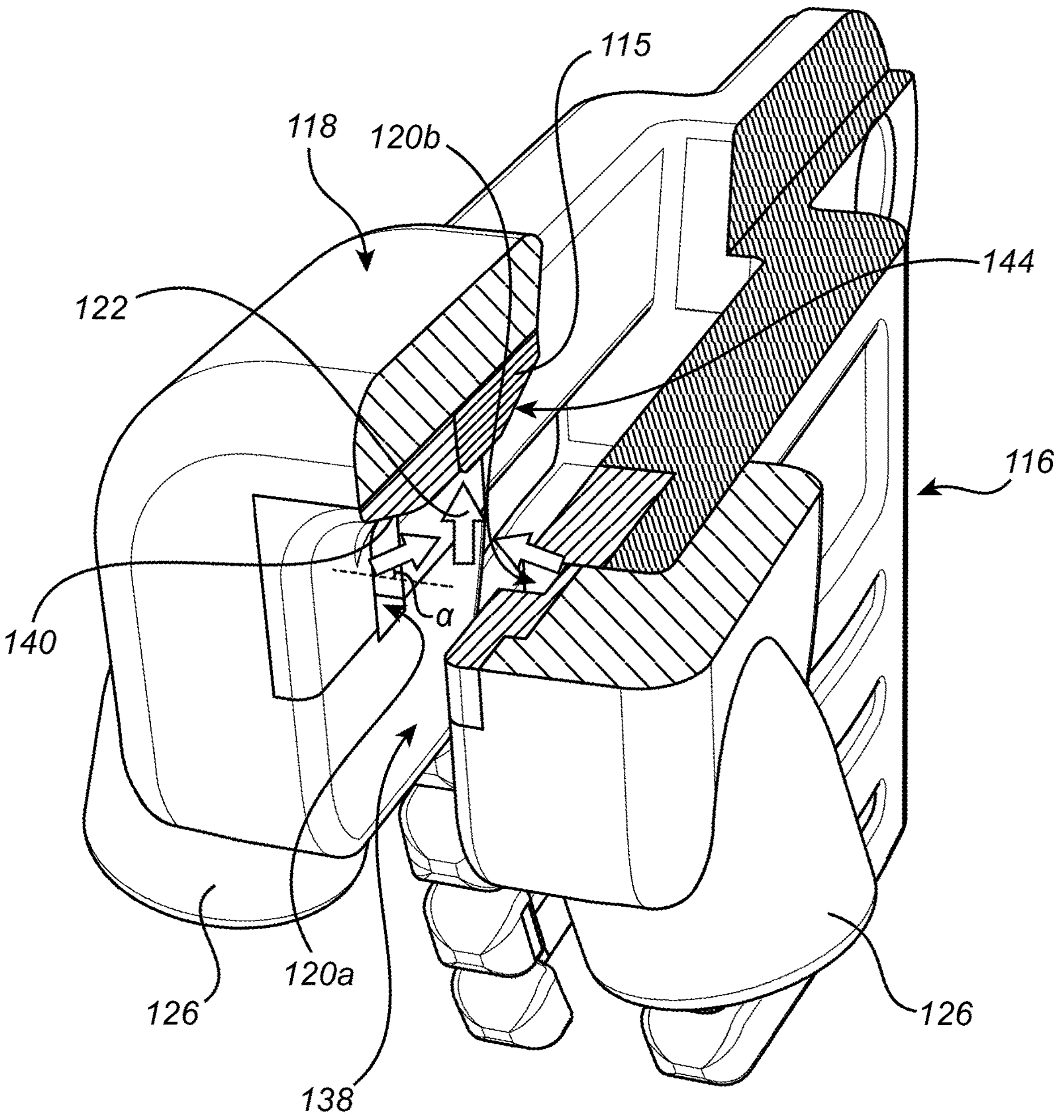
FIG. 2 conceptually illustrates a nozzle attached to a fixed contact according to embodiments of the invention.

To further suppress the arcs, the electric current switch 100 further comprises a nozzle 118 fixedly arranged to surround the position of the fixed arcing contact 115 of the fixed contact assembly 116, as illustrated in FIG. 2. The nozzle 118 comprises at least one outlet 120*a,b* to provide a flow of cooling gas 122 towards the arcing contact 115 of the fixed contact assembly 116. The flow of cooling gas being in the proximal direction of the contact lever 104 as defined with the contact lever 104 is in the closed position. Thus, the proximal direction is generally along an axis between the outlet 120*a* and the fixed arcing contact 115 of the fixed contact assembly 116.

In the example embodiment shown in FIG. 1, the electric current switch comprises an earth contact 124 configured to receive the contact lever 104 in an earthed position of the contact lever 104. The contact lever 104 is configured to rotate about the pivot point 110 between the earthed position, the closed position, and an open position. Thus, from the open position shown in FIG. 1, the contact lever 104 can rotate in the counterclockwise direction, in the perspective in FIG. 1, about the axis 112 to reach the earthed position where the proximal end 106 of the contact lever 104 electrically contacts the earth contact 124. Preferably, the fixed contact assembly 116 and the earth contact 124 are stationary with respect to the pivot point 110 when the contact lever 104 moves between the earthed position, the closed position, and the open position. The earth contact 124 may be bolted or screwed to a fixing point of the housing 102.

The nozzle 118 comprises at least one inlet 126 for receiving compressed gas and a puffer 128 connected via hoses 130 or pipes 130 to the inlets 126. The puffer is configured to provide the compressed cooling gas to the nozzle 118.

The puffer 128 is configured to provide the compressed gas when the contact lever 104 is moved for current interruption process to timely provide the cooling gas for suppressing an arc. For this, an actuator or rod 132 of the puffer 128 is pulled by a drive mechanism 133 and moves together with the contact lever 104 when the contact lever 104 moves from the closed position towards the open position. In this way, the compressed cooling gas is caused to flow through the hoses 130 or pipes 130 to the nozzle 118. A puffer generally operates by the compression of an enclosed volume of gas, whereby the gas is ejected out from the puffer via the hoses 130 or pipes 130 from the enclosed volume. In other words, the gas is forced out from the enclosed volume by the compression of the enclosed volume.

If the contact lever is further moved to the earthed position at earth contact 124, the drive mechanism 133 will stay in a middle position and thus not follow the contact lever 104 all the way to the earthed portion.

During a current making event, when the contact lever 104 moves into the nozzle from the open position, the drive mechanism 133 moves to push back the piston inside the puffer 128 via the rod 132.

The puffer can be filled during a current making events in various ways. For example, by implementing one-way gas vent for the puffer gas can freely fill the puffer without creating a counter force on the contact lever 104. Alternatively, by letting the puffer actuator 132 move in slowly by the drive mechanism 133 before the contact lever 104 starts the current making operation. As a further alternative, the puffer can be filled by sucking in gas through the nozzle 118.

Preferably, and as is better illustrated in FIG. 2, the nozzle 118 is fixedly attached to the fixed contact assembly 116, for example by means of an adhesive, screws or bolts.

With further reference to FIG. 2, in this embodiment, the nozzle 118 comprising two outlets 120*a* and 120*b* arranged on opposite sides of an opening 138 of the nozzle 118. The opening 138 is open towards the contact lever 104 so that it can receive the proximal end 106 of the contact lever 104 in the closed position. In the close position, the outlets 120*a* and 120*b* are arranged on opposite sides of the contact lever 104 and are configured to cooperatively create a flow of cooling gas in the proximal direction towards the fixed arcing contact 115 of the fixed contact assembly 116. Thus, the combination of the two outlet holes creates an upward-directed flow towards an arc root.

The outlets 120*a-b* are configured to direct the compressed gas at an angle $\alpha$ in the range of 0-90 degrees, or 10-75 degrees, or most preferably 15-60 degrees with respect to the contact lever 104 when it is in the closed position. The angle is with respect to the surface of the lever main contact area 141 on the proximal end 106 of the contact lever 104, shown in FIG. 1, which surface is generally parallel with the plane of rotation of the contact lever 104.

Figure 3:
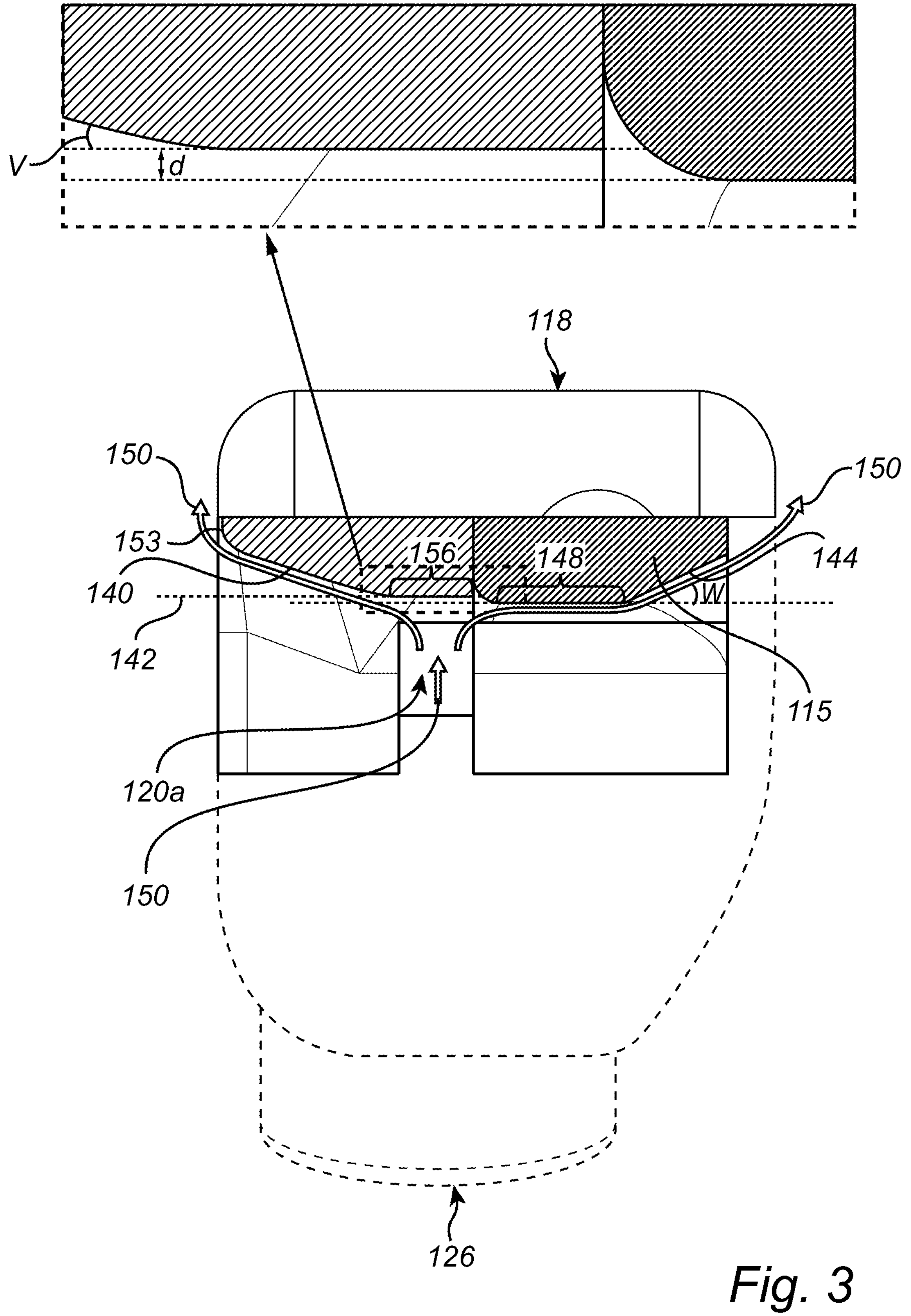
FIG. 3 is a cross-section of a nozzle and a fixed arcing contact of the fixed contact according to embodiments of the invention.

FIG. 3 illustrates a cross-section of the nozzle 118 and the fixed arcing contact 115 of the fixed contact assembly 116. Here, one of the outlets 120*a* is shown. The nozzle 118 comprises an inclined surface 140 angled with respect to an axis 142 along which the contact lever 104 is configured to move in the nozzle 118, the angle v is in the range of 0-45 degrees. The contact lever 104 thus enters the nozzle at the inclined portion 140 and moves towards the fixed arcing contact 115, when moving from the open position to the closed position. The inclined surface 140 reaches or faces away from the fixed arcing contact 115 of the fixed contact assembly 116. When compressed gas is ejected from the outlet 120*a* towards the fixed arcing contact 115, at least a portion of the compressed gas from the arcing contacts including fixed arcing contact 115 is directed away from the arcing contacts of the contact lever 104 and the fixed contact assembly 116 by the inclined surface 140. Thus, the inclined surface 140 allows for the cooling gas to flow at least partly in the proximal direction. The inclined surface 140 is optional and the receiving portion 156 may equally well reach all the way to the end portion 153 of the nozzle, effectively making the angle v zero.

In a similar configuration, the fixed arcing contact 115 of the fixed contact assembly 116 comprises an inclined portion 144 angled with respect to a contact section 148 configured to contact the lever arcing contact 114 of the contact lever 104. The inclined portion 144 is adapted for guiding cooling gas in the proximal direction away from the fixed contact assembly 116. Thus, the upward directed flow 150 of compressed cooling gas is split in two directions at the arc root: along the arc towards the contact lever 104 and guided by the inclined surface 140, and in the opposite direction along the fixed arcing contact 115 of the fixed contact assembly 116 guided by the inclined portion 144. The angles and dimensions of the outlets holes and nozzle may be selected such that very little hot gas flows downwards to the fixed main contact 152 of the fixed contact assembly 116, better seen in FIG. 1. As an example, the angle w of the inclined portion 144 with respect to the contact section 148 may be in range of 5-20 degrees. The contact section 148 is at least 1 mm long.

With further reference to FIG. 3, the nozzle 118 comprises a receiving portion 156 for the contact lever 104. The receiving portion 156 is adjacent to the fixed arcing contact 115 of the fixed contact assembly 116 and located between the fixed arcing contact 115 and the inclined surface 140. The receiving portion 156 is offset or displaced, in the proximal direction so that the receiving portion 156 is spaced apart from the contact lever 104 in the proximal direction, when the contact lever 104 is in the closed position. In other words, there is a gap between the receiving portion 156 and the proximal end 106 of the contact lever 104 when it is in the closed position. Further, the receiving portion 156 is proximally offset with respect to the contact section 148 by a displacement d. The displacement d ensures that the contact lever 104 can travel freely past the receiving portion 156 and make contact with the arcing contact section 148 of the fixed arcing contact 115.

Figure 4:
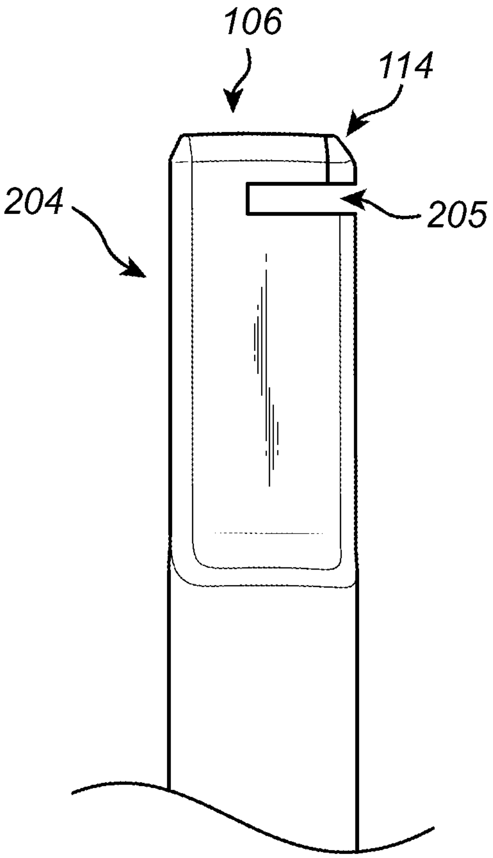
FIG. 4 conceptually illustrates a contact lever according to embodiments of the invention.

FIG. 4 conceptually illustrates the proximal end 106 of a contact lever 204 according to embodiments of the present disclosure. The contact lever 204 comprises a cut-out 205 adjacent to the lever arcing contact 114. The cut-out 205 is distally located with respect to the arcing contact 114.

The cut-out 205 advantageously reduces the amount of hot cooling gas that can flow downwards into the fixed main contact 152 of the fixed contact assembly 116 shown in FIG. 1.

Figure 5:
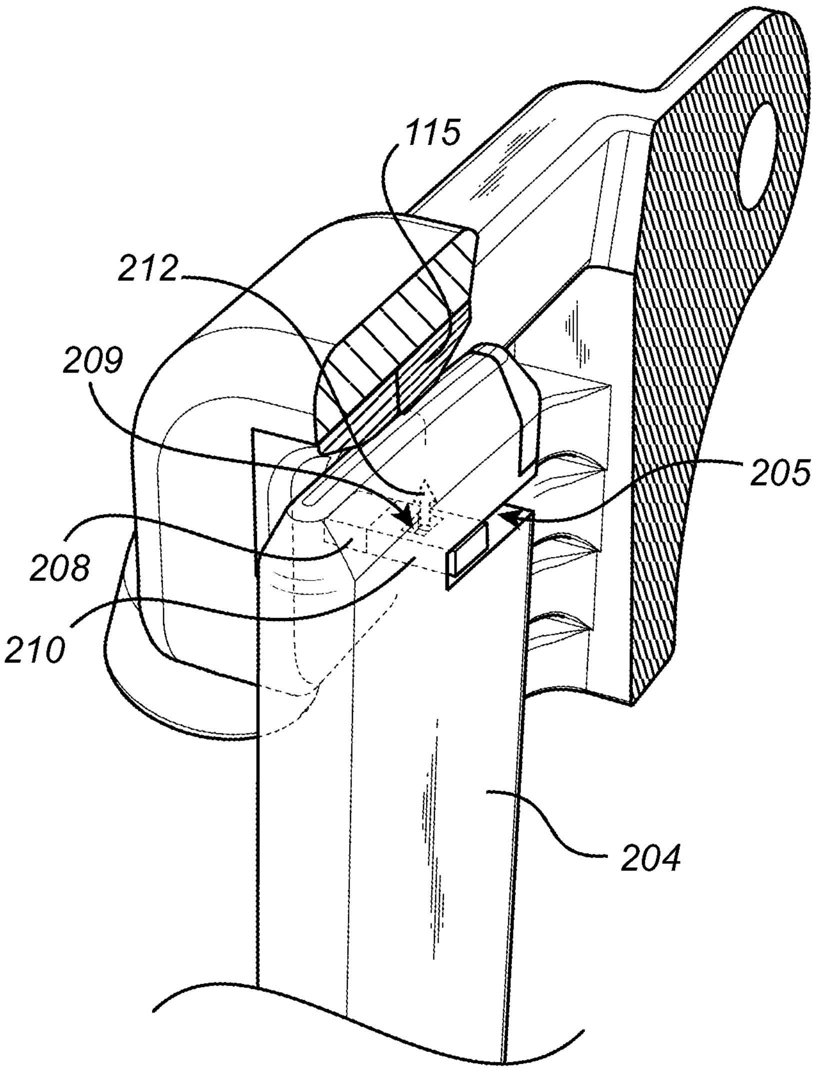
FIG. 5 conceptually illustrates a nozzle attached to a fixed contact, and a contact lever according to embodiments of the invention.

Turning to FIG. 5, with the cut-out 205 in the contact lever 204, an outlet arrangement 210 of the nozzle 118 may be adapted so that an outlet 209 is located in the cut-out 205 when the contact lever 204 is in the closed position. The outlet arrangement may comprise a duct or channel 208 that leads to the outlet 209 adapted to provide the compressed cooling gas 212 towards the fixed arcing contact 115. The outlet 209 is facing in the proximal direction of the contact lever 204, so that the cooling gas is directed towards the arcing contact 115 of the fixed contact assembly 116 and away from the fixed main contact 152 shown in FIG. 1.

Figure 6:
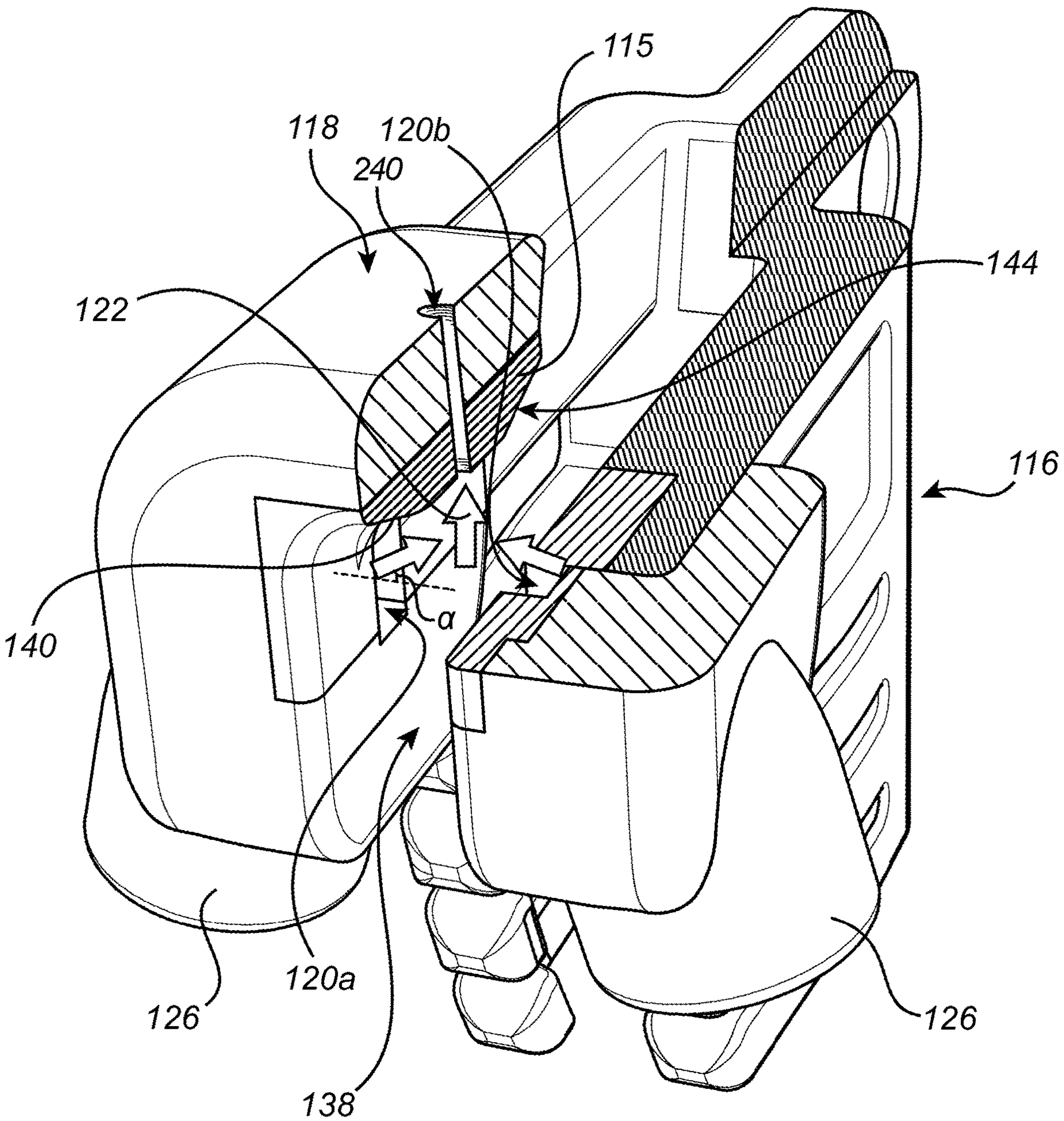
FIG. 6 conceptually illustrates a nozzle attached to a fixed contact according to embodiments of the invention.

Optionally, and as illustrated in FIG. 6, the nozzle 118 according to embodiments may comprise a hole 240 directed in the proximal direction for guiding cooling gas away from the arc regions. The hole 240 is a through-hole that reaches through the nozzle 118 adjacent to the fixed arcing contact 115.

The electric current switch 100 of the herein disclosed embodiments is preferably a knife switch in which the contact lever 104, 204 is a knife contact. In this case, the proximal end 106 of the contact lever may be blade-shaped with two opposite parallel surfaces, where one of the surfaces is the surface of the lever main contact area 141.

The nozzle and arcing contacts of the fixed contact assembly and the contact lever described herein may be dimensioned and shaped in various ways and are not limited to the specific configuration shown in the drawings.

For example, the shape of the outlets **120*a,b*** may be rectangular, elliptical, circular or generally polygonal. The size of the outlets, either the sides of a rectangular or square outlet, or the diameter of a circular or elliptical outlet may be in the range of 4 mm to 10 mm, for example about 6 mm.

Further, the nozzle 118 may be made from a suitable material appropriate for medium voltage applications. Example materials include Polytetrafluoroethylene (PTFE), Perfluoroalkoxy alkane (PFA), and Fluorinated ethylene propylene (FEP).

Even though the invention has been described with reference to specific exemplifying embodiments thereof, many different alterations, modifications and the like will become apparent for those skilled in the art.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An electric current switch comprising:

a housing;

a contact lever having a proximal end and a distal end, the contact lever is rotatable at a pivot point at the distal end, the contact lever including a lever main contact area and a lever arcing contact at the proximal end;

a fixed contact assembly configured to receive the contact lever in a closed position of the contact lever, the fixed contact assembly including a fixed main contact and a fixed arcing contact, the fixed contact assembly being fixed relative to the housing accommodating the fixed contact assembly;

the contact lever is configured to rotate about the pivot point between the closed position and an open position, the electric current switch further including a nozzle fixedly arranged to surround a position of the fixed arcing contact, the nozzle having at least two outlets to cooperatively provide a flow of cooling gas in a proximal direction towards the fixed arcing contact of the fixed contact assembly, the two outlets are arranged on opposite sides of an opening of the nozzle adapted to receive the contact lever so that the outlets are arranged on opposite sides of the contact lever in the closed position, the flow of cooling gas being in the proximal direction of the contact lever when the contact lever is in the closed position, wherein the contact lever is a knife contact, and the electric current switch is a knife switch.

2. The electric current switch according to claim 1, wherein the nozzle includes at least one inlet for the cooling gas, and wherein the electric current switch includes a puffer connected via hoses or pipes to the at least one inlet, the puffer being configured to provide the cooling gas to the nozzle.

3. The electric current switch according to claim 2, wherein a drive mechanism of the puffer is configured to push on the contact lever when the contact lever moves from the closed position towards the open position, and while pushing on the contact lever cause a flow of the cooling gas through the hoses or pipes to the nozzle.

4. The electric current switch according to claim 1, wherein the nozzle is fixedly attached to the fixed contact assembly.

5. The electric current switch according to claim 1, wherein the nozzle includes an inclined surface angled with respect to an axis along which the contact lever is configured to move in the nozzle, the inclined surface reaches away from the fixed main contact so that at least a portion of the cooling gas is directed away from the lever arcing contact and the fixed arcing contact by the inclined surface.

6. The electric current switch according to claim 1, wherein the fixed arcing contact includes an inclined portion angled with respect to a contact section configured to make contact with the lever arcing contact, the inclined portion being adapted for guiding the cooling gas in the proximal direction.

7. The electric current switch according to claim 1, comprising an earth contact configured to receive the contact lever in an earthed position of the contact lever, the contact lever is configured to rotate about the pivot point between the earthed position, the closed position, and the open position.

8. The electric current switch according to claim 7, wherein the fixed contact assembly and the earth contact are stationary with respect to the pivot point when the contact lever moves between the earthed position, the closed position, and the open position.

9. The electric current switch according to claim 1, wherein the nozzle comprises a receiving portion for the contact lever, the receiving portion is adjacent to the fixed arcing contact of the fixed contact assembly and is offset in the proximal direction of the contact lever as defined when the contact lever is in the closed position so that the receiving portion is spaced apart from the contact lever in the proximal direction.

10. The electric current switch according to claim 1, wherein the nozzle comprises a through-hole along the proximal direction for guiding the cooling gas away from arc regions.

11. The electric current switch according to claim 1, wherein the contact lever comprises a cut-out adjacent to the lever arcing contact.

12. The electric current switch according to claim 11, the nozzle comprises an outlet arrangement adapted so that at least one of the outlets is located in the cut-out when the contact lever is in the closed position.

13. The electric current switch according to claim 1, wherein the outlets are configured to direct the cooling gas at an angle ($\alpha$) in a range of 0-90 degrees with respect to the contact lever when in the closed position.

14. An electric current switch comprising:

a housing;

a contact lever having a proximal end and a distal end, the contact lever is rotatable at a pivot point at the distal end, the contact lever including a lever main contact area and a lever arcing contact at the proximal end;

a fixed contact assembly configured to receive the contact lever in a closed position of the contact lever, the fixed contact assembly including a fixed main contact and a fixed arcing contact, the fixed contact assembly being fixed relative to the housing accommodating the fixed contact assembly;

the contact lever is configured to rotate about the pivot point between the closed position and an open position, the electric current switch further having a nozzle fixedly arranged to surround a position of the fixed arcing contact, the nozzle including at least one outlet to provide a flow of cooling gas towards the fixed arcing contact, the flow of cooling gas being in a proximal direction of the contact lever when the contact lever is in the closed position.

15. The electric current switch according to claim 14, wherein the nozzle includes at least one inlet for the cooling gas, and wherein the electric current switch includes a puffer connected via hoses or pipes to the at least one inlet, the puffer being configured to provide the cooling gas to the nozzle.

16. The electric current switch according to claim 15, wherein a drive mechanism of the puffer is configured to push on the contact lever when the contact lever moves from the closed position towards the open position, and while pushing on the contact lever cause a flow of the cooling gas through the hoses or pipes to the nozzle.

17. The electric current switch according to claim 14, wherein the nozzle is fixedly attached to the fixed contact assembly.

18. The electric current switch according to claim 14, wherein the nozzle includes an inclined surface angled with respect to an axis along which the contact lever is configured to move in the nozzle, the inclined surface reaches away from the fixed main contact so that at least a portion of the cooling gas is directed away from the lever arcing contact and the fixed arcing contact by the inclined surface.

19. The electric current switch according to claim 14, wherein the fixed arcing contact comprises an inclined portion angled with respect to a contact section configured to make contact with the lever arcing contact, the inclined portion being adapted for guiding the cooling gas in the proximal direction.

20. The electric current switch according to claim 14, wherein the contact lever comprises a cut-out adjacent to the lever arcing contact.

* * * * *